United States Patent [19]
Engel

[11] Patent Number: 5,734,237
[45] Date of Patent: Mar. 31, 1998

[54] INTEGRATED DC ELECTRIC CONTROLLER/CHARGER

[75] Inventor: Gabriel D. Engel, New Britain, Conn.

[73] Assignee: Tenergy L.L.C., New Britain, Conn.

[21] Appl. No.: 657,821

[22] Filed: May 31, 1996

Related U.S. Application Data

[63] Continuation of Ser. No. 399,814, Mar. 7, 1995.

[51] Int. Cl.$^6$ .................................................. H02D 5/17
[52] U.S. Cl. ........................ 318/139; 318/268; 363/127; 307/66; 320/138; 320/DIG. 10
[58] Field of Search .................................. 318/254, 269, 318/138, 439, 139, 801, 800, 803, 268; 363/120, 127, 89, 147; 307/66, 64; 320/138, 139, DIG. 10, DIG. 11, DIG. 27, 140

[56] References Cited

U.S. PATENT DOCUMENTS

| | | |
|---|---|---|
| 3,665,221 | 5/1972 | Wickliff . |
| 3,943,423 | 3/1976 | Hoffman . |
| 3,974,660 | 8/1976 | Farr . |
| 4,366,388 | 12/1982 | Wilkerson . |
| 4,491,768 | 1/1985 | Slicker . |
| 4,602,322 | 7/1986 | Merrick . |
| 4,626,750 | 12/1986 | Post . |
| 4,654,776 | 3/1987 | Basire . |
| 4,819,147 | 4/1989 | Bingham . |
| 4,920,475 | 4/1990 | Rippel . |
| 5,055,994 | 10/1991 | Schoofs . |
| 5,099,186 | 3/1992 | Rippel et al. . |
| 5,332,954 | 7/1994 | Lankin . |
| 5,341,075 | 8/1994 | Cocconi . |

*Primary Examiner*—John W. Cabeca
*Attorney, Agent, or Firm*—Pepe & Hazard, LLP

[57] ABSTRACT

A drive assembly for an electric vehicle comprises a D.C. electric motor and an integrated charger controller for controlling the D.C. electric motor in a drive mode of operation and for charging a battery in a charge mode of operation. The integrated charger/controller includes a power module, (ii) a step-down module, and (iii) a control circuit. During the charge mode of operation, the input of the power module is connected to an electric power source and the power module provides a D.C. current output. Selected switches of the control circuit connect the output of the power module to the input of a step-down module, and connect the output of the step-down module to the terminals of the battery to charge it during the drive mode of operation, selected switches of the control circuit connect the terminals of the battery to the input of the power module, and connect the output of the power module to the D.C. motor to control the D.C. motor.

20 Claims, 9 Drawing Sheets

INTEGRATED DC ELECTRIC CONTROLLER/CHARGER

This is a continuation of copending application Ser. No. 08/399,814 filed on Mar. 7, 1995.

BACKGROUND OF THE INVENTION

This invention relates generally to drive assemblies including a D.C. motor, battery and charger, and, more particularly, to such a drive assembly which includes an integrated electronic charger/controller.

Conventional battery operated motors utilize separate battery chargers and motor controller circuits. Although these circuits may utilize similar components, the controller and the charger are not operated at the same time. Separate chargers and controllers increase the number of components, cost, size, and weight which is especially critical in the design of electrically powered vehicles.

Recently, integrated battery charger and motor controllers have been developed. Exemplary of such devices are those illustrated in Ripple U.S. Pat. Nos. 4,920,475 and 5,099,186, Slicker U.S. Pat. No. 4,491,768 ant Coconi U.S. Pat. No. 5,341,075. The integrated charger/controllers of these patents are directed to single phase battery chargers and polyphase A.C. electric motor controllers. In comparison to a single phase D.C. motor, a polyphase A.C. motor requires a relatively more complex device to generate the rotating magnetic field which operates the motor. Moreover, polyphase A.C. motor controllers cannot be used to drive single phase D.C. motors. In addition, the integrated charger/controllers of these patents utilize a step-up converter to achieve high voltage recharge levels for high power batteries.

Accordingly, it is an object of the present invention to provide an electric drive assembly for vehicles which include a an integrated battery charger and motor controller.

It is also an object to provide such a drive assembly which utilizes a low power battery and a single phase D.C. electric motor.

Another object is to provide such drive assembly which is relatively simple in construction and reliable in operation.

A further object is to provide a novel method for charging a battery and controlling a D.C. electric motor for driving a vehicle.

SUMMARY OF THE INVENTION

It has now been found that the foregoing and related objects may be readily attained in a drive assembly including a D.C. electric motor and an integrated charger/controller for controlling the D.C. electric motor in a drive mode of operation and for charging a battery in a charge mode of operation. The integrated charger/controller includes (i) a power module, (ii) a step-down module, and (iii) a control circuit. During the charge mode of operation the input of the power module is connected to an electric power source and the output of the power module supplies D.C. current. Selected switches of the control circuit connect the output of the power module to the input of a step-down module, and connect the output of the step-down module to the terminals of the battery to charge it. During the drive mode of operation, selected switches of the control circuit connect the terminals of the battery to the input of the power module, and connect the output of the power module to the D.C. motor to control the D.C. motor.

Generally, the step-down module includes a transistor, a diode and an inductor, the transistor being connected in parallel with the diode and connected in series with the inductor. Desirably, the power module includes the transistor of the step-down module.

In its preferred form, the power module may be connected to both an A.C. and D.C. electric power source. If an A.C. power source is used, the power module rectifies the A.C. current input to produce a D.C. current output.

Preferably, the power module is a programmable pulse width modulated converter and includes power transistors and a parallel/series switching system. The parallel/series switching system connects the power transistors in series during the charge mode of operation whereby the power transistors rectify the A.C. current input to produce the D.C. current output of the power module. During the drive mode of operation, the parallel/series switching system connects the power transistors in parallel whereby the power transistors control the D.C. motor.

Alternatively, the power module may include a transformer, diodes and transistors, whereby the transformer reduces the A.C. power source input voltage, the diodes rectify the A.C. current input to produce the D.C. current output of the power module, and the transistors control the D.C. motor.

An inductor may be connected between the transistor of the step-down module and the diode of the step-down module to correct the power factor of the A.C. power input. This inductor is connected in series with the transistor and connected in parallel with the diode. Alternatively, a capacitor may be connected in parallel with the battery and the diode of the step-down module to correct the power factor of the A.C. power input.

Preferably, the voltage of the output of the step-down module is not greater than 100 volts.

DETAILED DESCRIPTION OF THE PREFERRED EMBODIMENTS

Figure 1:
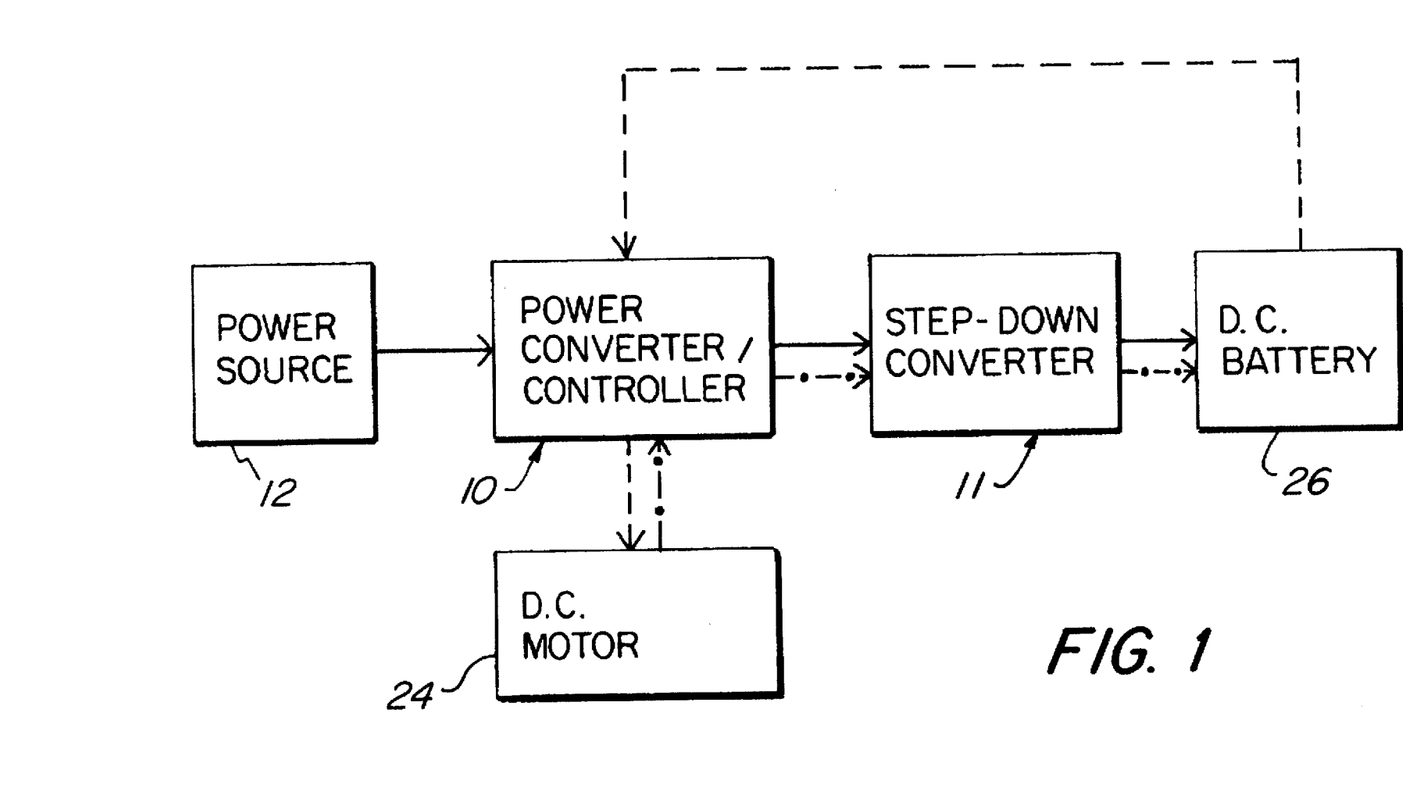
FIG. 1 is a block diagram of a drive assembly embodying the present invention.

Turning first to FIG. 1, a block diagram of a drive assembly embodying the present invention is illustrated as comprised of a DC motor 24 which derives power through the power converter/controller 10 from either a battery 26 or an electric power source 12. The electric power source 12 may be either A.C. or D.C. The power converter/controller 10 also channels power from the battery 26 through the step-down converter 11. The integrated charger/controller has two modes of operation: (1) a charge mode as indicated by the solid arrows and (2) a drive mode as indicated by the dashed arrows in FIG. 1.

During the charge mode of operation, the input of the power converter/controller 10 is connected to either a D.C. or an A.C. electric power source 12 and the output of the power converter/controller 10 supplies D.C. current. If an A.C. power source is used, the power converter/controller 10 rectifies the A.C. current input to produce a D.C. current output. If a D.C. power source is used, the D.C. current would flow unrectified through the power converter/controller 10. The voltage of the D.C. current from the power converter/controller 10 is then lowered by a step-down converter 11 to a voltage level which does not exceed the voltage level of the low voltage battery 26.

If the battery 26 is sufficiently charged, the drive mode may commence during which the D.C. current from battery 26 is controlled by the power converter/controller 10, which in turn supplies a single phase D.C. voltage to drive the D.C. motor 24.

Thus, the integrated power charger/controller performs the functions of voltage conversion during the charge mode of operation and voltage regulation during the drive mode of operation.

Figure 2:
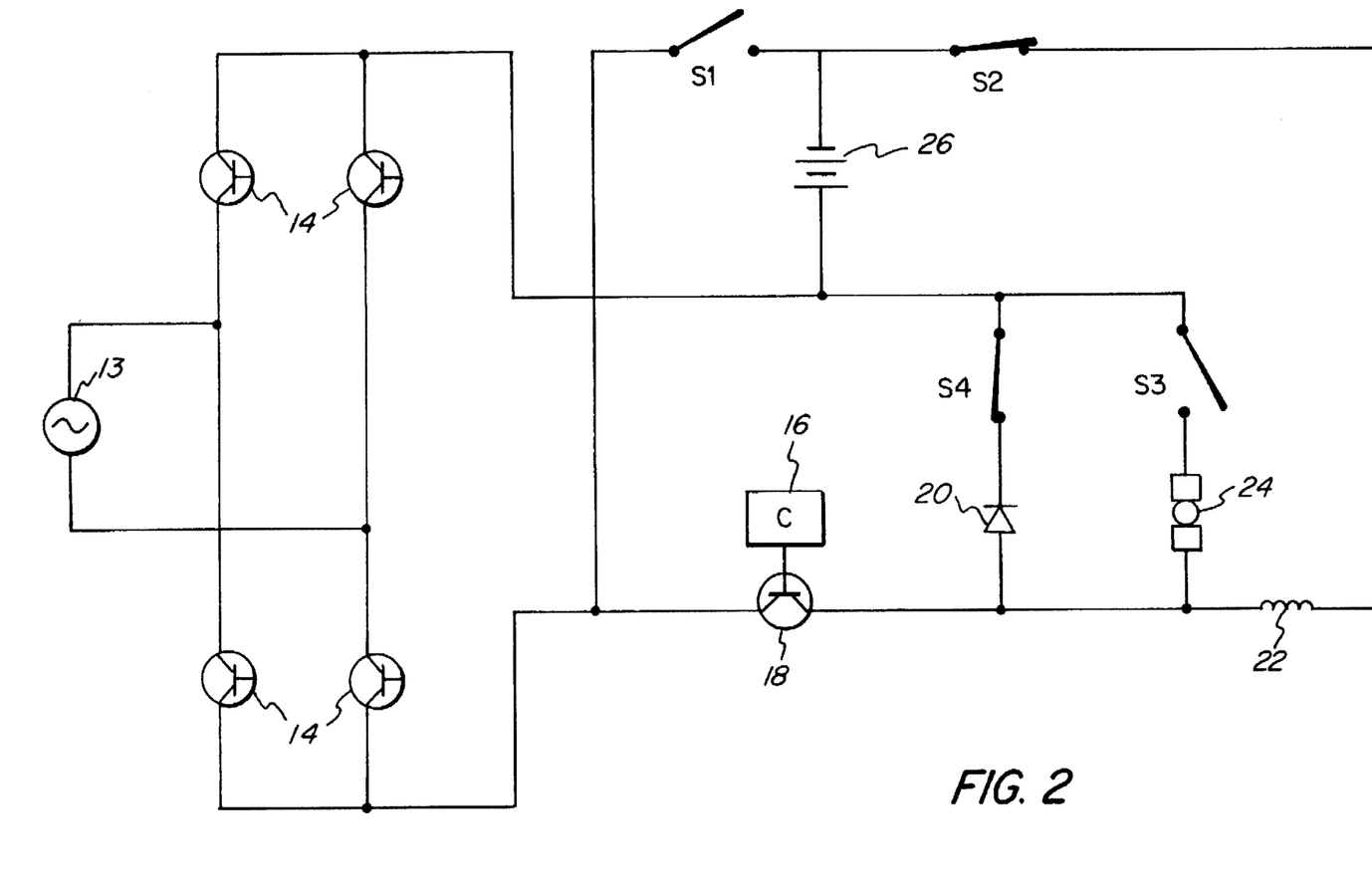
FIG. 2 is a circuit diagram of the integrated charger/controller of the present invention using the high voltage power transistors of the pulse width modulator connected in series to rectify the A.C. input during the charge mode of operation.

Turning next to FIG. 2, therein schematically illustrated is the circuitry of the integrated charger/controller of the present invention during the charge mode of operation. The A.C. power source 13 current is rectified by power transistors 14 which are connected in series during the charge mode of operation. The power converter/controller 10 includes a programmable pulse width modulator (PWM) which, in turn, includes the power transistors 14, a microprocessor control circuit 16, a switching transistor 18, a diode 20, and electronic switches S1, S2, S3, and S4.

During the charge mode of operation, the switches S2 and S4 are closed to connect the battery 26 with the low voltage D.C. output of the step-down converter 11. The rectified voltage output of transistors 14 is then lowered to the charging voltage level for the battery 26 by the step-down converter 11. The step-down converter 11, in turn, includes a transistor 18 connected in parallel to a diode 20 and connected in series to an inductor 22.

Figure 9:
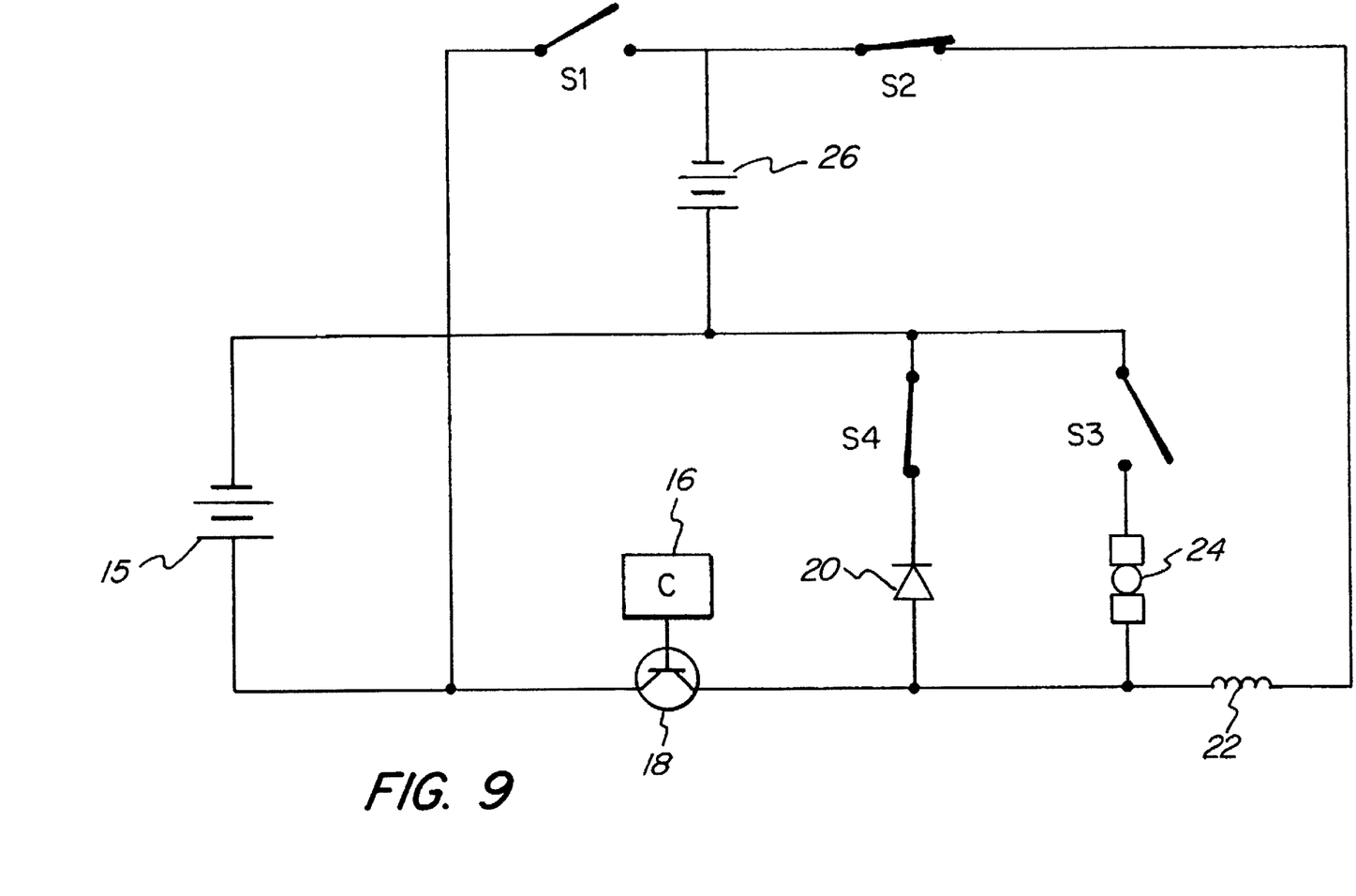
FIG. 9 is a circuit diagram of an integrated charger/controller according to the present invention connected using a D.C. power supply.

As previously mentioned, a D.C. power supply 15 may be utilized in place of the A.C. power supply 13, as illustrated in FIG. 9. It is unnecessary to rectify the D.C. power source 15 current in order to charge the battery 26 when using a D.C. power supply 15. The power converter/controller 10 may still regulate the current of the D.C. power supply 15 if the current of the supply is unregulated. Apart from the operation of rectifying the current from the A.C. power supply 13, the operation of the drive assembly is the same using a D.C. power supply 15. For instance, the step-down converter 11 will lower the voltage output of power convert/controller 10 to the charging voltage level of the battery 26 in when using either type of power source.

Figure 3:
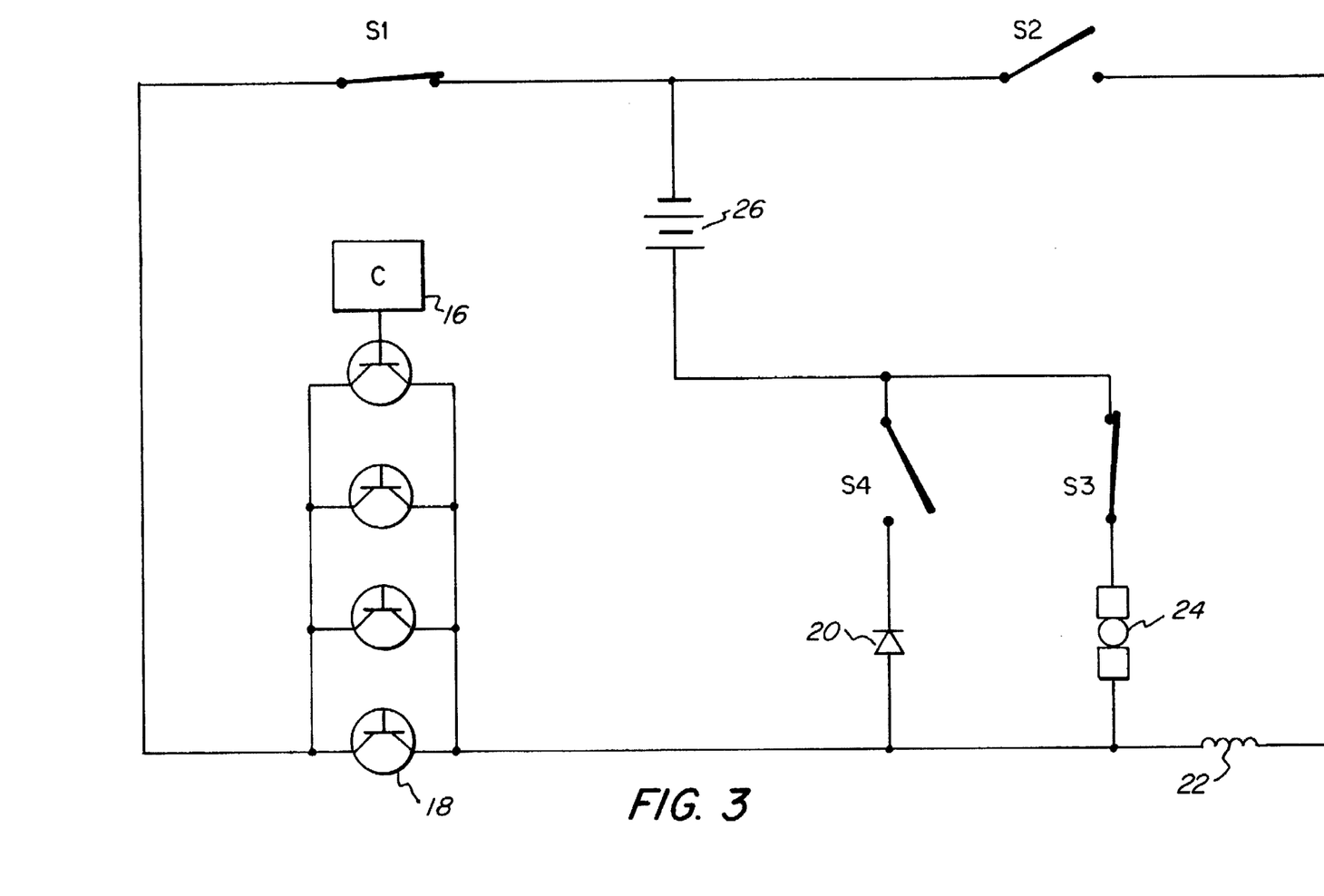
FIG. 3 is a circuit diagram of the integrated charger/controller using the high voltage power transistors of the pulse width modulator connected in parallel to control the D.C. motor during the drive mode of operation.

Turning next to FIG. 3, the schematic circuit diagram shows the integrated charger/controller of the present invention during a drive mode of operation. The PWM microprocessor control circuit 16 connects the power transistors 14 in parallel during the drive mode of operation. The switches S1 and S3 are closed and the switches S4 and S2 are opened to connect the D.C. battery 26 to the power transistors 14, which in turn supply a controlled voltage output to drive the battery 24.

Figure 4:
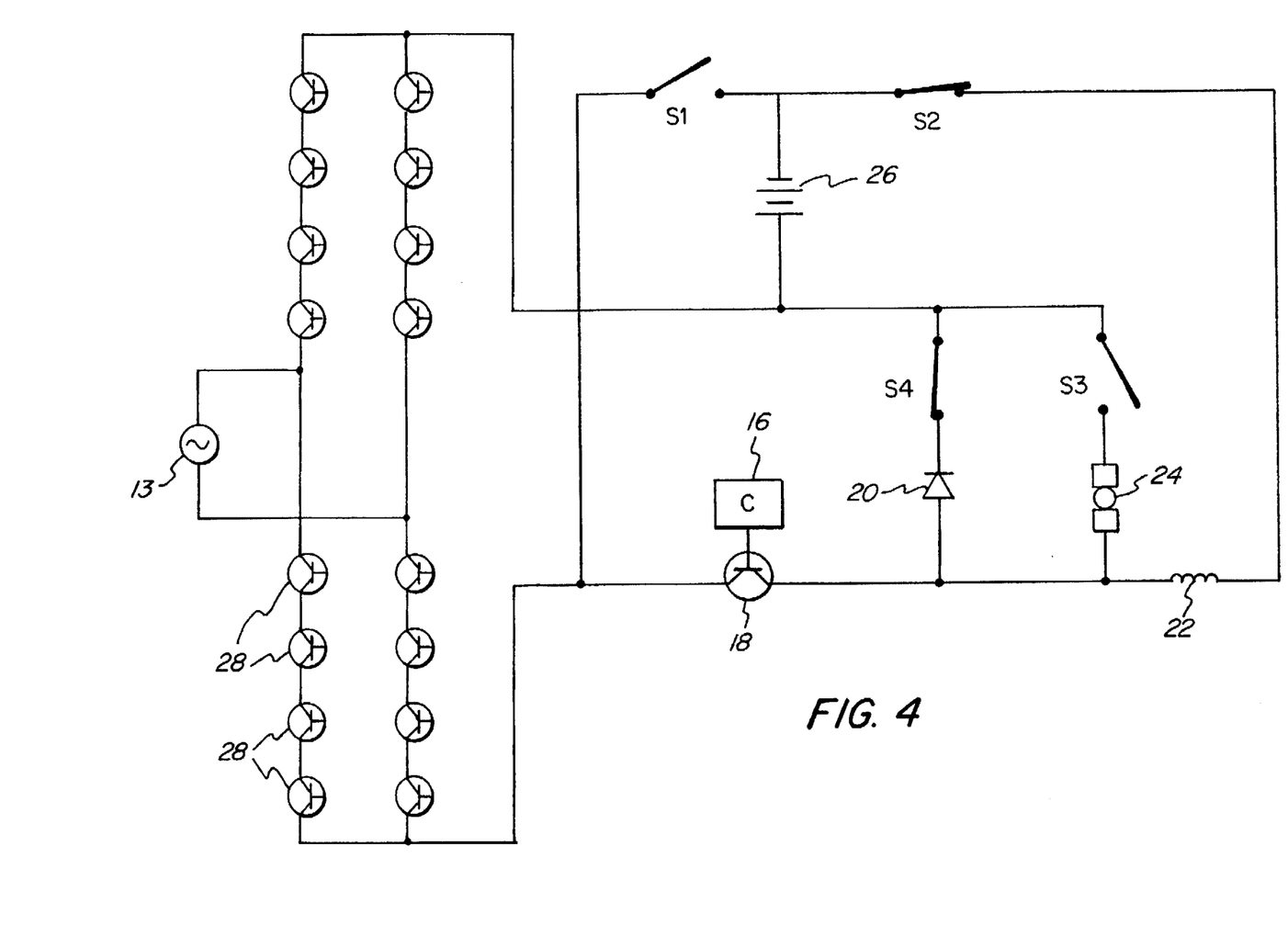
FIG. 4 is a circuit diagram of the integrated charger/controller using low voltage power transistors of the pulse width modulator connected in series to rectify the A.C. input during the charge mode of operation.

As illustrated in FIG. 4, a multiplicity of lower power PWM transistors 28 may be connected in series to provide the same degree of A.C. voltage input rectification as a lesser number of high voltage PWM power transistors 14.

Figure 5:
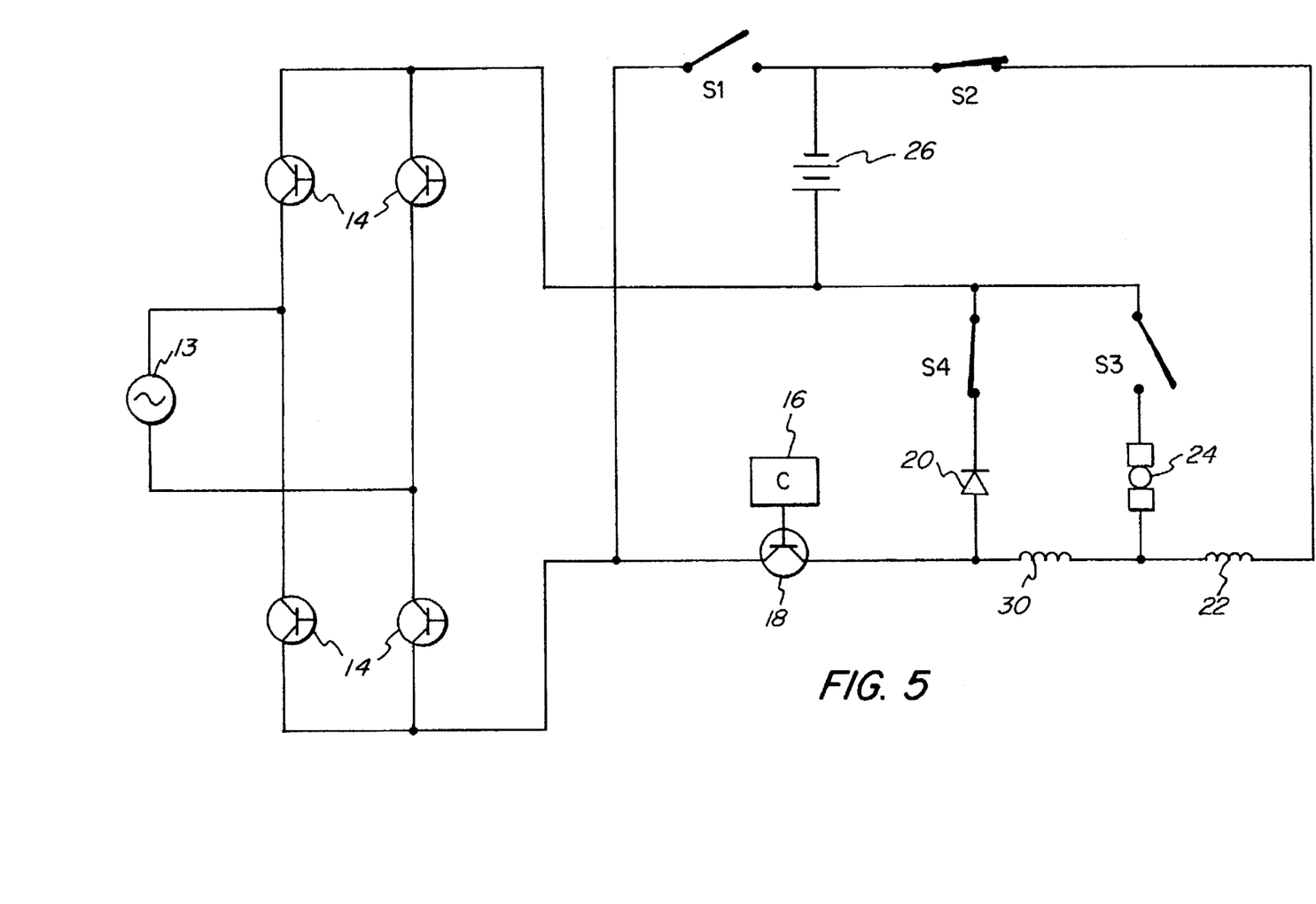
FIG. 5 is a circuit diagram of the integrated charger/controller of FIG. 2 with a power factor correcting inductor.
Figure 6:
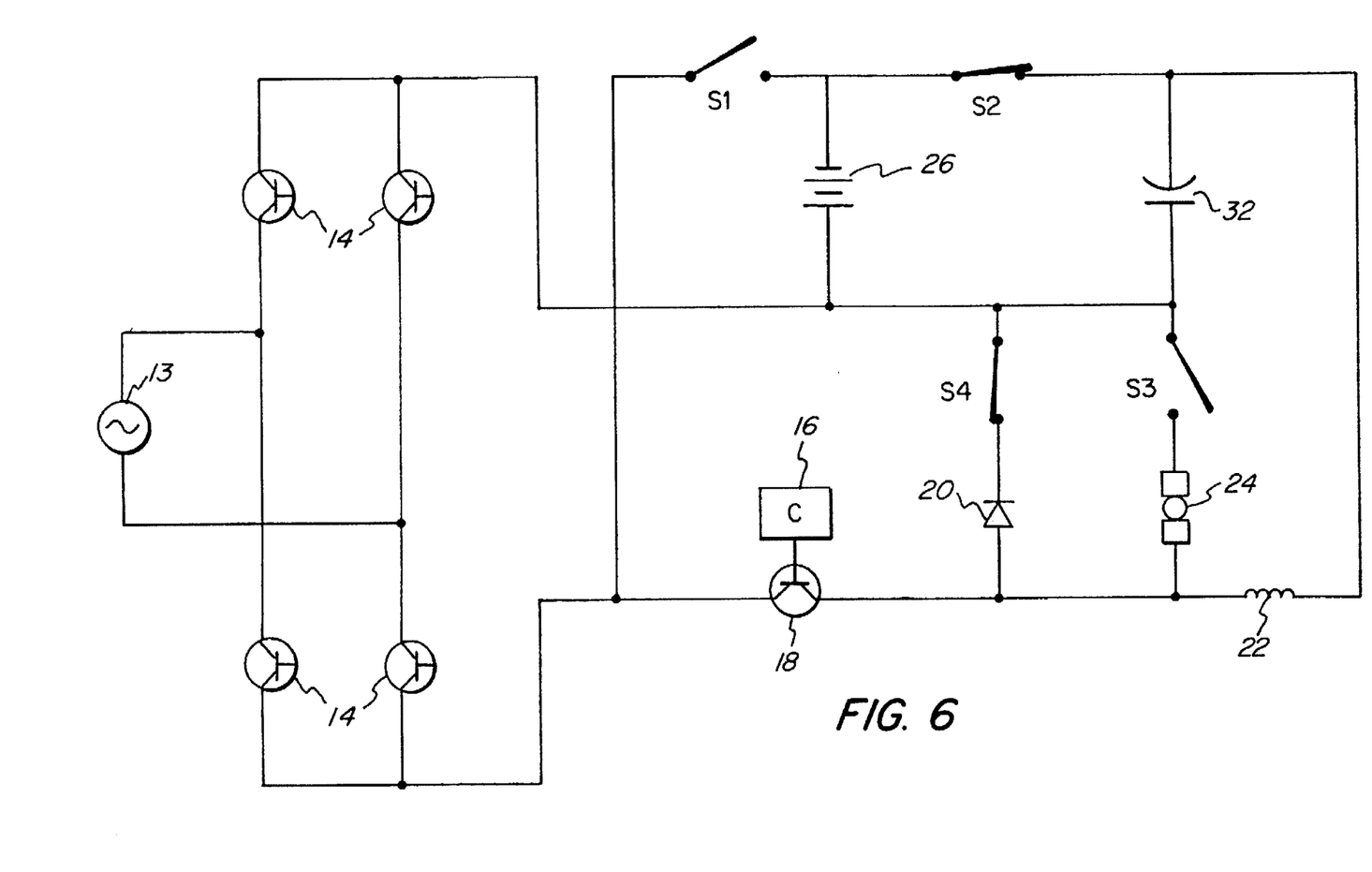
FIG. 6 is a circuit diagram of the integrated charger/controller of FIG. 2 with a power factor correcting capacitor.

As illustrated in FIG. 5, the integrated charger/controller circuit may be modified by incorporating an additional inductor 30 to correct for power factor. The inductor 30 is connected between the transistor 18 and the diode 20 of the step-down converter 11, and is in series with the transistor 18 and in parallel with the diode 20. As seen in FIG. 6, the inductor 30 may be replaced by a capacitor 32 which would similarly correct the power factor. The capacitor 32 is connected between the battery 26 and the diode 20 of the step-down converter 11, and is in parallel with the battery 26 and the diode 20. Power factor correction, however, generally yields negligible efficiency increases in charging low voltage batteries (e.g., below 100 volts).

Figure 7:
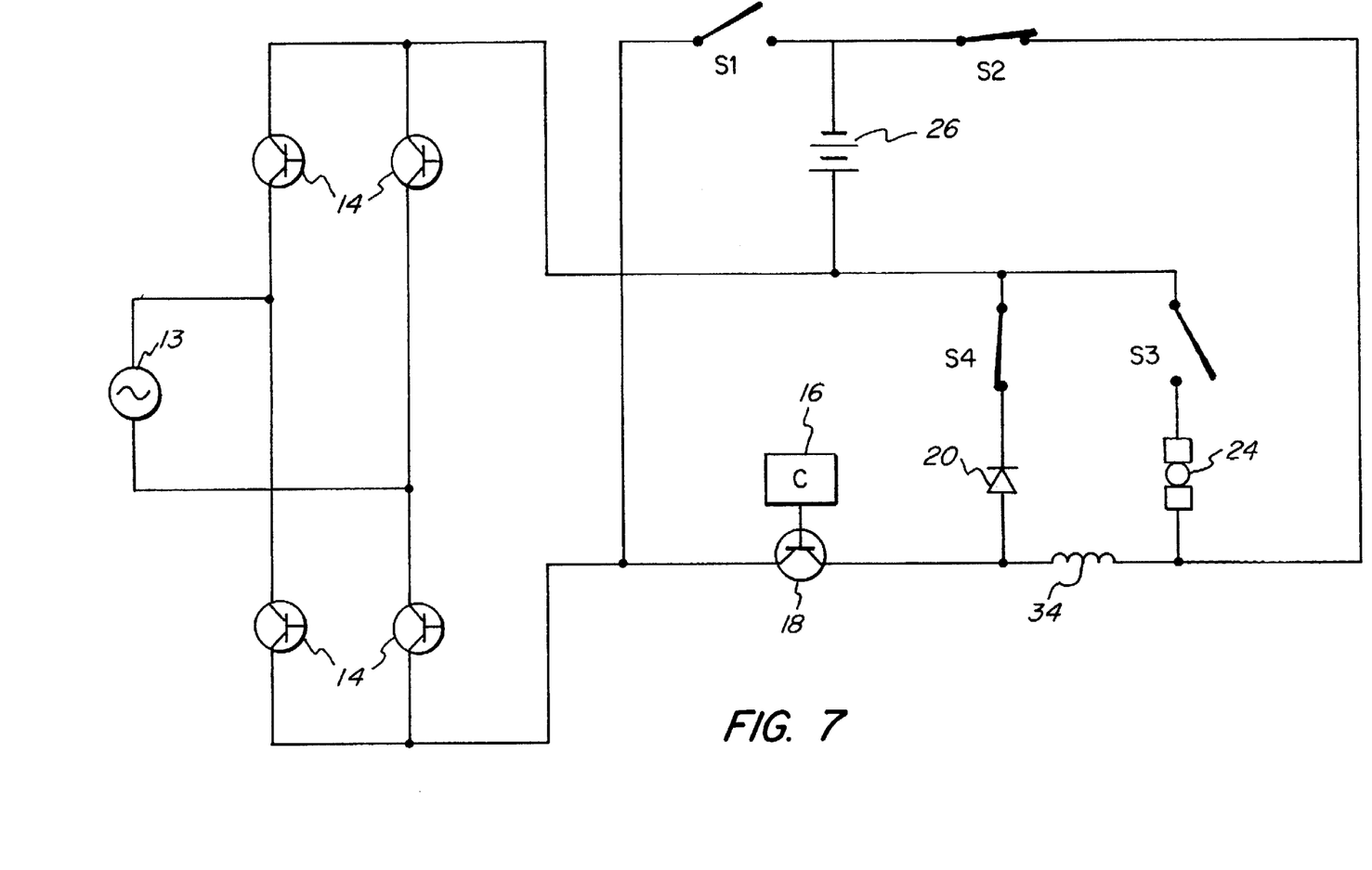
FIG. 7 is a circuit diagram of the integrated charger/controller of FIG. 2 using the series winding of the D.C. motor for the step-down converter inductor.

In a further embodiment as illustrated in FIG. 7, the inductor which already exists in the series winding 34 of the D.C. motor 24 may be used to replace the inductor 22 of the step-down converter 11. This eliminates the need for the inductor 22 thereby saving weight and cost.

Figure 8:
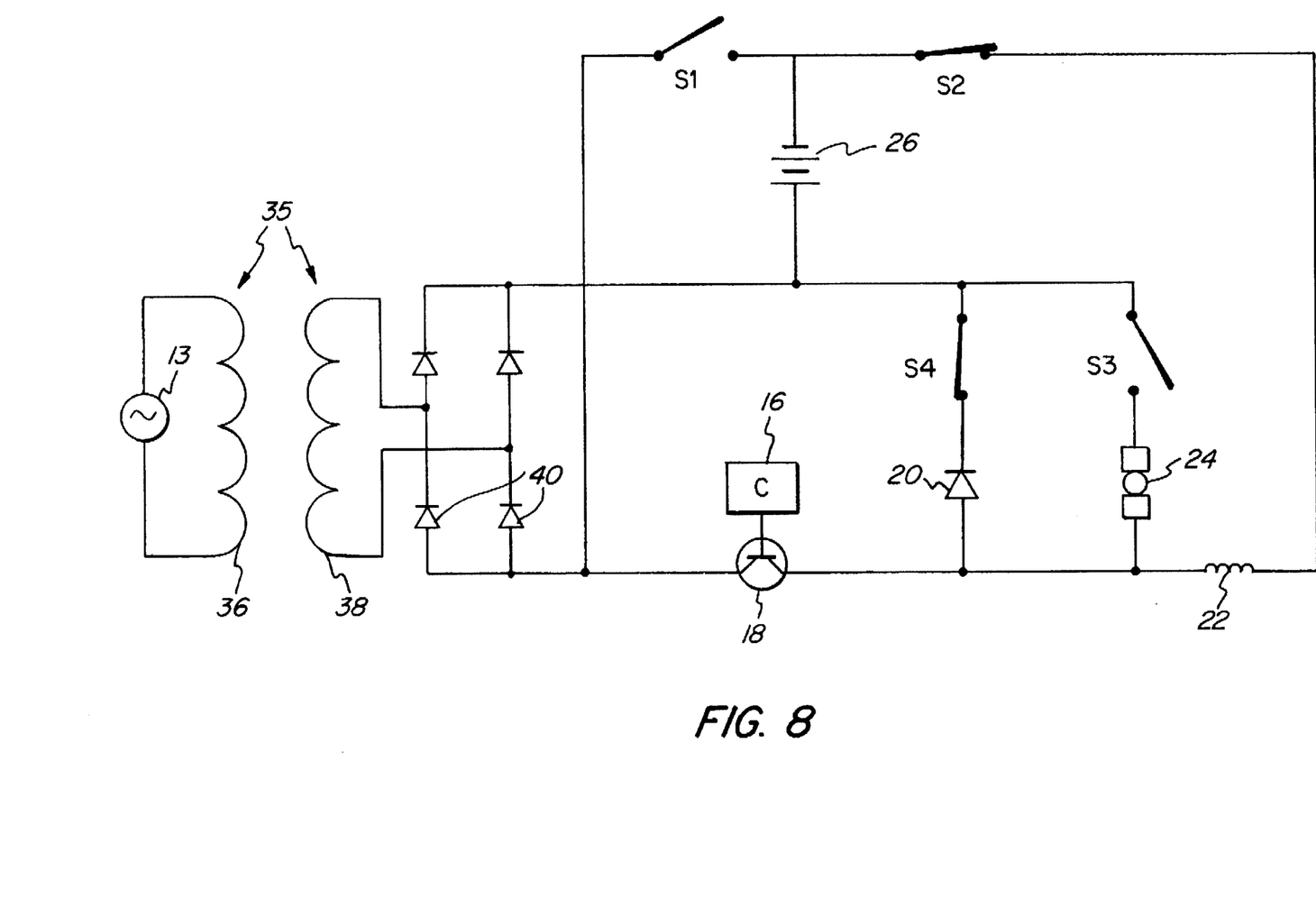
FIG. 8 is a circuit diagram of an integrated charger/controller according to the present invention using a transformer to reduce the A.C. input voltage and diodes to rectify the A.C. input current.

Illustrated in FIG. 8 is an alternative embodiment of the integrated charger/controller of the present invention which incorporates a transformer generally designated by the numeral 35 and diodes 40. The transformer 40 lowers the voltage of the A.C. power source 13 and the diodes 40 rectify this lowered voltage. The A.C. power source 13 is connected to the primary winding 100 of voltage transformer 35. Next, the voltage of the A.C. power source 13 is lowered through the secondary winding 38 of the voltage transformer 35, the output of which is connected to the switching diodes 40. The switching diodes 40, in turn, rectify the lowered voltage of the A.C. power input, thereby performing the same function as the high power switching transistors 14 of the PWM circuit.

The programmable PWM of the integrated charger/controller circuit allows the programming of various charging characteristics for charging batteries having a variety of characteristics. Accordingly, each battery may utilize a proprietary charging algorithm. In addition, the PWM may also be used as a pulse charger to increase the battery cycle life, or to quick charge the battery.

Thus, it can be seen from the foregoing detailed description and attached drawings that the drive assembly of the present invention includes an integrated charger/controller which eliminates redundant components of separate chargers and controllers and thereby achieves savings in terms of cost, weight and space. It enables efficient use of low power batteries and single phase DC motors.

I claim:

1. A drive assembly including a D.C. electric motor and an integrated charger/controller for controlling said D.C. electric motor in a drive mode of operation and adapted to be connected to an electric power source for charging battery in a charge mode of operation comprising:

(a) a power module having an output and an input adapted to be connected to an associated electric power source during a charge mode of operation wherein said power module provides a D.C. current to said output;

(b) a step-down module having an input connected to said power module and an output adapted to be connected to terminals of an associated battery;

(c) a control circuit including switch means having a multiplicity of switches, said control circuit having
  (i) a drive mode of operation during which selected ones of said switches selectively effect the connection of the terminals of the associated battery to said input of said power module and selected ones of said switches selectively effect the connection of said output of said power module to said D.C. motor whereby said power module controls the said D.C. motor, and
  (ii) a charge mode of operation during which said input of said power module is adapted to be connected to the associated electric power source, selected ones of said switches selectively effect the connection of said output of said power module to said input of said step-down module, and said output of said step-down module is adapted to be connected to the terminals of the associated battery whereby the associated battery is charged.

2. The drive assembly according to claim 1 wherein said step-down module includes a transistor, a diode and an inductor, said transistor being connected in parallel with said diode and connected in series with said inductor.

3. The drive assembly according to claim 2 wherein said power module includes said transistor of said step-down module.

4. The drive assembly according to claim 1 wherein said power module is adapted to be connected to both a D.C. and an A.C. power source.

5. The drive assembly according to claim 1 wherein the power module is adapted to be connected to is a D.C. power source and to pass the D.C. current therethrough to said step-down module.

6. The drive assembly according to claim 1 wherein said power module is adapted to be connected to an A.C. power source and converts A.C. to D.C.

7. The drive assembly according to claim 6 wherein said power module is a programmable pulse width modulated converter.

8. The drive assembly according to claim 7 wherein said programmable pulse width modulated converter includes power transistors and a parallel/series switching system, said parallel/series switching system connects said power transistors in series during said charge mode of operation whereby said power transistors rectify the associated A.C. current input to said D.C. current output of said power module and said parallel/series switching system connects said power transistors in parallel during said drive mode of operation whereby said power transistors control the associated D.C. motor.

9. The drive assembly according to claim 6 wherein said power module includes a transformer, diodes and transistors, whereby said transformer reduces the associated A.C. power source input voltage, said diodes rectify the A.C. current input to D.C. current output of said power module and said transistors control said D.C. motor.

10. The drive assembly according to claim 6 wherein said step-down module includes a transistor, a diode and a first inductor, said transistor being connected in parallel with said diode and connected in series with said first inductor, a second inductor connected between said transistor of said step-down module and said diode of said step-down module, said second inductor connected in series with said transistor and connected in parallel with said diode whereby said second inductor corrects the power factor of the associated A.C. power input.

11. The drive assembly according to claim 6 wherein said step-down module includes a transistor, a diode and an inductor, said transistor being connected in parallel with said diode and connected in series with said inductor, a capacitor connected in parallel with said battery and said diode of said step-down module whereby said capacitor corrects the power factor of the associated A.C. power input.

12. The drive assembly according to claim 1 wherein the voltage of said output of said step-down module is not greater than 100 volts.

13. A drive assembly including a D C. electric motor and an integrated charger/controller for controlling said D.C. electric motor in a drive mode of operation and adapted to be connected to an electric power source for charging a battery in a charge mode of operation comprising:

(a) a power module having an output and an input adapted to be connected to an associated electric power source during a charge mode of operation wherein said power module provides a D.C. current to said output;

(b) a step-down module having an input connected to said power module and an output adapted to be connected to terminals of an associated battery, said step-down module including a transistor, a diode and an inductor, said transistor being connected in parallel with said diode and connected in series with said inductor said power module including said transistor of said step-down module, the voltage of said output of said step-down module being not greater than 100 volts;

(c) a control circuit including switch means having a multiplicity of switches, said control circuit having
  (i) a drive mode of operation during which selected ones of said switches selectively effect the connection of the terminals of the associated battery to said input of said power module and selected ones of said switches selectively effect the connection of said output of said power module to said D.C. motor whereby said power module controls the said D.C. motor, and
  (ii) a charge mode of operation during which said input of said power module is adapted to be connected to the associated electric power source, selected ones of said switches selectively effect the connection of said output of said power module to said input of said step-down module, and said output of said step-down module is adapted to be connected to the terminals of the associated battery whereby the associated battery is charged.

14. The drive assembly according to claim 13 wherein said power module is adapted to be connected to both a D.C. and an A.C. power source.

15. The drive assembly according to claim 13 wherein said power module is adapted to be connected to an A.C. power source to convert A.C. to D.C., and wherein said power module is a programmable pulse width modulated converter including power transistors and a parallel/series switching system, said parallel/series switching system connects said power transistors in series during said charge mode of operation whereby said power transistors rectify the associated A.C. current input to said D.C. current output of said power module and said parallel/series switching system connects said power transistors in parallel during said drive mode of operation whereby said power transistors control the associated D.C. motor.

16. The drive assembly according to claim 13 wherein said power module is adapted to be connected to an A.C.

power source to convert A.C. to D.C., and said power module includes a transformer, diodes and transistors, whereby said transformer reduces the associated A.C. power source input voltage, said diodes rectify the A.C. current input to said D.C. current output of said power module, and said transistors control said D.C. motor.

17. In a method for charging a battery from an alternating current power source and for controlling a single phase D.C. motor, the steps comprising:
   (a) providing a power module including an integrated power and step-down converter and switching means operable to effect switching between charging and motor drive modes;
   (b) supplying alternating electric current from an electric power source to said power module;
   (c) rectifying said alternating current in said power module to provide direct current;
   (d) stepping down the voltage of said direct current in said module to provide an output of direct current at a lower voltage level;
   (e) providing said direct current output directly to said battery to effect charging thereof;
   (f) switching from the charging to the motor drive mode;
   (g) supplying to said power module an unregulated direct current output from said battery; and
   (h) controlling said unregulated direct current output from said battery in said power converter to produce a controlled direct current output to said single phase D.C. motor.

18. The method for charging a battery from an alternating current power source and for controlling a single phase D.C. motor in accordance with claim 17 wherein said step of rectifying said alternating current in said power module includes pulse width modulating said alternating current to provide said direct current.

19. The method for charging a battery from an alternating current power source and for controlling a single phase D.C. motor in accordance with claim 18 wherein said step of rectifying said alternating current in said power module includes connecting power transistors in series with a parallel/series switching system, and passing said alternating current through said power transistors to provide said direct current output.

20. The method for charging a battery from an alternating current power source and for controlling a single phase D.C. motor in accordance with claim 18 wherein said step of controlling unregulated D.C. current output in said power converter includes connecting power transistors in parallel with a parallel/series switching system converter, and passing said unregulated direct current output from said battery through said power transistors to control said single phase D.C. motor.

* * * * *